F. MILLER.
WAGON JACK.
APPLICATION FILED MAY 10, 1912.
1,105,091.
Patented July 28, 1914.
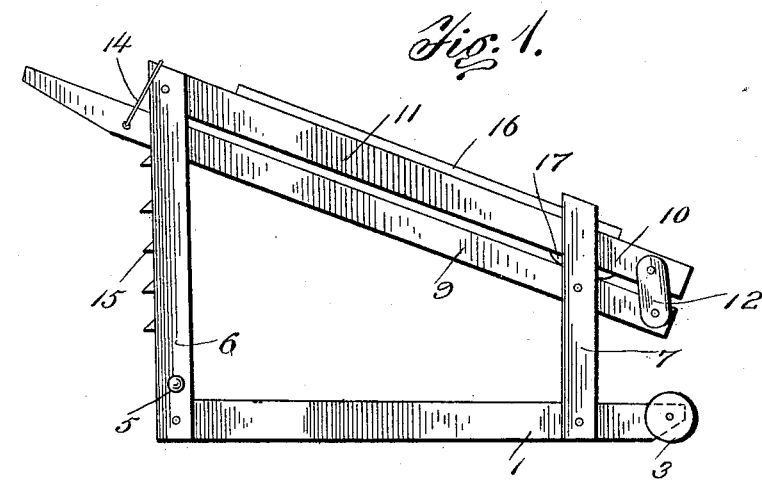
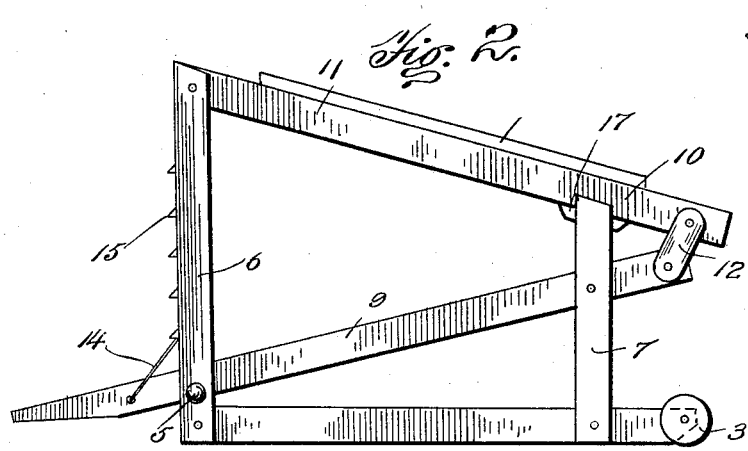
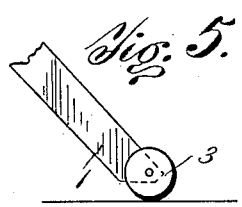
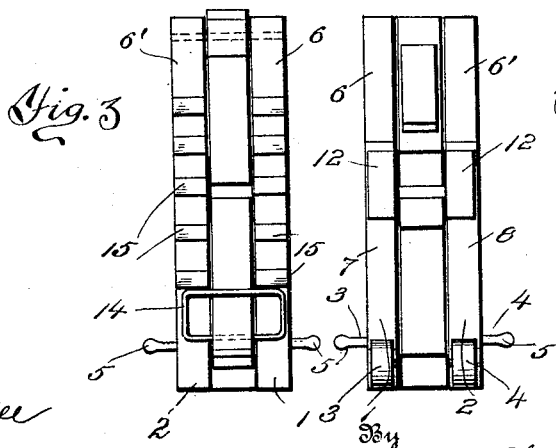
Witnesses
M. P. McKee
G. C. Tracy
Inventor
F. Miller
By Alex. J. Wedderburn, Jr.
Attorney
THE NORRIS PETERS CO., PHOTO-LITHO., WASHINGTON, D. C.

UNITED STATES PATENT OFFICE.

FERDINAND MILLER, OF COVINGTON, KENTUCKY.

WAGON-JACK.

1,105,091. Specification of Letters Patent. Patented July 28, 1914.

Application filed May 10, 1912. Serial No. 696,284.

*To all whom it may concern:*

Be it known that I, FERDINAND MILLER, a citizen of the United States, residing at Covington, in the county of Kenton and State of Kentucky, have invented certain new and useful Improvements in Wagon-Jacks, of which the following is a specification.

This invention relates to improvements in wagon jacks and has for its object to provide a wagon jack having great lifting power which is cheap to construct, easy to move and at the same time very durable.

With the above and other objects in view I have invented the device illustrated in the accompanying drawings in which—

Figure 1 is a side elevational view of my jack in an inoperative position, Fig. 2 is a similar view in an operative position, Fig. 3 is a rear end elevation, Fig. 4 is a front end elevation, and Fig. 5 is a detail view showing the means for bringing the wheels into play.

Like reference characters indicate like parts throughout the specification and in the several views in the drawings in which 1 and 2 represent base members, having their forward lower corners cut away whereby the rear end of said base members may be raised and the forward ends thereof which carry wheels 3 and 4 will not contact the ground. Said wheels being so mounted on said members that the lower surface of the wheels will aline with the lower surface of the members when they are seated on the ground as shown in Figs. 1 and 2. By means of this arrangement the jack will remain perfectly still when lifting and as the wheels are not in play at the time no amount of pressure can cause the device to roll from under its load. However when it is desired to move the jack all that is necessary to do is to take a hold of the handles 5 on the uprights 6 and 6′ and raise the device at the rear when the wheels 3 and 4 will come into use as shown in Fig. 5 and the jack may be rolled in the same manner as a wheel barrow.

Mounted on the members 1 and 2 are a pair of standards 7 and 8 between which is pivoted the lever 9 and which acts as a fulcrum therefor. The members 7 and 8 extend up to engage the movable end 10 of the lever 11 which is pivoted at its rear end between the uprights 6 and 6′. The forward ends of the levers 9 and 10 being linked together by links 12. The lever 10 is held against lateral movement by means of the members 7 and 8 between which it is vertically movable.

The rear end of the lever 9 is vertically movable between the members 6 and 6′ and is provided with a loop 14 thereon outwardly of said members 6 and 6′, said loop being pivoted to said lever 9 whereby it will be free to engage under the notches 15 on the outer edges of the members 6 and 6′ in order to hold the lever down in a desired position, or to engage the upper ends of said members 6 and 6′ to hold said lever up when placing the jack under an axle. On the upper surface of the lever 11 is a rubber or other flexible and frictional pad 16 which will both frictionally grip and at the same time prevent injury to the axle. The lever 11 may be provided with a depending lug 17 to hold it in engagement with the members 7 and 8 when in a raised position. The lever 9 is fulcrumed near the upper end of the standards 7 and 8.

Having now described my invention that which I claim to be new and desire to procure by Letters Patent is:

A jack comprising a horizontal supporting frame, two pairs of upright arms disposed in spaced-apart relation, the forward of said pairs being extended above the other, the forward pair of said arms being formed with downwardly and rearwardly inclined edges, a pin spanning said first named pair of arms at their upper ends, a pin spanning said second pair of arms at their upper ends, a lever fulcrumed at one end upon said second-named pivot and limited against movement by said first-named pin, a second lever disposed over said first-named lever, a link pivotally connected at opposite ends to the ends of the first and second named levers, said second lever being pivoted upon said first named lever and disposed flush with the outer longitudinal edge of said arms, a series of jagged teeth extending in a vertical series outwardly of said relatively longer arms and having their under surfaces disposed at right angles to said arms, said first lever projecting forwardly of said frame, and a substantially U-shaped link pivotally connected to the operating forwardly projecting end of said first lever, said link arranged to engage the upper V-shaped ends of said first named arms.

In testimony whereof I affix my signature in presence of two witnesses.

FERDINAND MILLER.

Witnesses:
CHAS. F. MILLER,
LOUISE MILLER.

---

Copies of this patent may be obtained for five cents each, by addressing the "Commissioner of Patents, Washington, D. C."